United States Patent
Yi et al.

(10) Patent No.: US 7,756,079 B2
(45) Date of Patent: Jul. 13, 2010

(54) RADIO COMMUNICATION SCHEME FOR PROVIDING MULTIMEDIA BROADCAST AND MULTICAST SERVICES (MBMS)

(75) Inventors: Seung June Yi, Seoul (KR); Young Dae Lee, Gyeonggi-Do (KR); So Young Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/464,779

(22) Filed: May 12, 2009

(65) Prior Publication Data

US 2009/0225693 A1 Sep. 10, 2009

Related U.S. Application Data

(63) Continuation of application No. 11/945,185, filed on Nov. 26, 2007, which is a continuation of application No. 10/668,632, filed on Sep. 23, 2003, now Pat. No. 7,623,483.

(30) Foreign Application Priority Data

Sep. 23, 2002 (KR) ............... 2002-57499
Nov. 7, 2002 (KR) ............... 2002-68922

(51) Int. Cl.
*H04Q 7/00* (2006.01)
*H04Q 7/24* (2006.01)
*H04L 12/56* (2006.01)
*H04J 3/26* (2006.01)

(52) U.S. Cl. ............... 370/328; 370/338; 370/400; 370/432

(58) Field of Classification Search ............... None
See application file for complete search history.

(56) References Cited

U.S. PATENT DOCUMENTS

2004/0246985 A1 12/2004 Kall et al.

(Continued)

FOREIGN PATENT DOCUMENTS

JP 2002-280951 9/2002

(Continued)

OTHER PUBLICATIONS

LG Electronics, Inc., "Use of DSCH for MBMS Multicast Mode", TSG-RAN Working Group 2 Meeting #32, R2-022573, Sep. 23, 2002.

(Continued)

*Primary Examiner*—Ayaz R Sheikh
*Assistant Examiner*—Blanche Wong
(74) *Attorney, Agent, or Firm*—Lee, Hong, Degerman, Kang & Waimey

(57) ABSTRACT

A radio communication scheme applicable to UMTS providing packet data services, such as multimedia broadcast and multicast services (MBMS), to one or more users by modifying (augmenting) certain existing radio communication protocols while employing a new transport channel (a point-to-multipoint DSCH), and/or by establishing new physical downlink shared channels (C-PDSCH and D-PDSCH). An RLC layer is provided in a single CRNC so that the same MBMS can be transmitted to a plurality of terminals via a point-to-multipoint DSCH, without having to repetitively provide many RLC layers in many SRNCs. Alternatively, a C-PDSCH (physical downlink shared channel for control) and a D-PDSCH (physical downlink shared channel for data) are established to allow periodic transmission of MBMS, permitting users to simultaneously access one or more MBMS.

12 Claims, 8 Drawing Sheets

U.S. PATENT DOCUMENTS

2005/0152398 A1    7/2005   Shin

FOREIGN PATENT DOCUMENTS

| KR | 10-2000-0059683 | 10/2000 |
| KR | 10-2002-0049856 | 6/2002 |
| KR | 10-2002-0075108 | 10/2002 |

OTHER PUBLICATIONS

Nokia, "UTRAN Architecture for MBMS", TSG-RAN WG2 meeting #31, R2-021849, XP-002508449, Aug. 19, 2002.

Hutchison 3G. "RAN Solution Proposal to Support MAMS", XP002249466, May 6, 2002.

LG Electronics Inc., "MBMS UTRAN Architecture for User Plane", TSG-RAN Working Group 2 Meeting #32, R2-022570, Sep. 23, 2002.

Nortel Networks; "Discussion on UTRAN Architecture for MBMS;" 3GPP TSG-RAN Meeting #31; Aug. 19, 2002; Tdoc R2-022017.

European Telecommunications Standards Institute (ETSI): "Universal Mobile Telecommunications Systems (UMTS); Physical Channels and Mapping of Transport Channels Onto Physical Channels (FDD) Release 4", ETSI TS 125 211 V4.5.0; Technical Specification; Jun. 2002; XP014008344.

RADIO COMMUNICATION SCHEME FOR PROVIDING MULTIMEDIA BROADCAST AND MULTICAST SERVICES (MBMS)

CROSS-REFERENCE TO RELATED APPLICATIONS

This application is a continuation of U.S. application Ser. No. 11/945,185, filed on Nov. 26, 2007, currently pending, which is a continuation of U.S. application Ser. No. 10/668,632, filed on Sep. 23, 2003, now U.S. Pat. No. 7,623,483, issued on Nov. 24, 2009, which pursuant to 35 U.S.C. §119, claims the benefit of earlier filing date and right of priority to Korean patent application No. 10-2002-57499, filed on Sep. 23, 2002, and Korean patent application No. 10-2002-68922, filed on Nov. 7, 2002, the contents of which are all hereby incorporated by reference herein in their entirety.

BACKGROUND OF THE INVENTION

1. Field of the Invention

The present invention relates to providing radio (wireless or mobile) data services, such as multimedia broadcast and multicast services (MBMS), in a radio (wireless or mobile) communication system, such as a universal mobile telecommunication system (UMTS), which is the European-type IMT-2000 system. MBMS can be provided to a plurality of users by modifying an existing transport channel (i.e., modify DSCH into a point-to-multipoint DSCH), and/or by establishing two new physical downlink shared channels (i.e., C-PDSCH and D-PDSCH).

2. Description of the Related Art

A universal mobile telecommunication system (UMTS) is a third generation mobile communication system that has evolved from a European standard known as Global System for Mobile communications (GSM), which aims to provide an improved mobile communication service based upon a GSM core network and wideband code division multiple access (W-CDMA) wireless connection technology.

In December 1998, the ETSI of Europe, the ARIB/TTC of Japan, the T1 of the United States, and the TTA of Korea formed the Third Generation Partnership Project (3GPP), which is currently creating a detailed specification for standardizing the UMTS.

The work towards standardizing the UMTS performed by the 3GPP has resulted in the formation of five technical specification groups (TSG), each of which is directed to forming network elements having independent operations. More specifically, each TSG develops, approves, and manages a standard specification in a related region. Among them, a radio access network (RAN) group (TSG-RAN) develops a specification for the function, items desired, and interface of a UMTS terrestrial radio access network (UTRAN), which is a new RAN (i.e., radio interface) for supporting a W-CDMA access technology in the UMTS.

I. Features of a UTRAN

The constituting elements of a UTRAN are: radio network controllers (RNCs), Node-Bs and user equipment (UE), such as a terminal. The RNCs enable autonomous radio resource management (RRM) by the UTRAN. The Node-B is based on the same principles as the GSM base station, being a physical element performing radio transmission/reception with cells. The UMTS UE is based on the same principles as the GSM mobile station (MS).

FIG. 1 depicts the components of a typical UMTS, whereby the UMTS generally comprises, among many other components, user equipment (UE) such as a terminal 10, a UTRAN 100 and a core network (CN) 200. The UMTS uses the same core network as that of general packet radio service (GPRS), but uses entirely new radio interfaces.

The UTRAN 100 includes one or more radio network sub-systems (RNS) 110, 120. Each RNS 110, 120 includes a radio network controller (RNC) 111,121 and one or more Node-Bs 112, 113, 122, 123 managed by the RNCs 111,121.

The RNCs 111,121 perform functions such as assigning and managing radio resources, and operate as an access point with respect to the core network 200.

The Node-Bs 112, 113, 122, 123, which are managed by the RNCs 111,121, receive information sent by the physical layer of a terminal 10 (e.g., mobile station, user equipment and/or subscriber unit) through an uplink (UL: from terminal to network), and transmit data to a terminal 10 through a downlink (DL: from network to terminal). The Node-Bs 112, 113, 122, 123 thus operate as access points of the UTRAN 100 for the terminal 10.

The core network 200 comprises, among other elements, a mobile switching center (MSC) 210 for supporting circuit exchange services, a gateway mobile switching center (GMSC) 220 for managing connections with other circuit switched networks, a serving GPRS support node (SGSN) 230 for supporting packet exchange services, and a gateway GPRS support node (GGSN) 240 for managing connections with other packet switched networks.

A primary function of the UTRAN 100 is to establish and maintain a radio access bearer (RAB) for a call connection between the terminal 10 and the core network 200. The core network 200 applies end-to-end quality of service (QoS) requirements to the RAB, and the RAB supports the QoS requirements established by the core network 200. Accordingly, the UTRAN 100 can satisfy the end-to-end QoS requirements by establishing and maintaining the RAB.

The RAB service can be further divided into lower conceptual levels, namely, into an Iu bearer service and a radio bearer service. The Iu bearer service handles reliable user data transmissions between boundary nodes of the UTRAN 100 and the core network 200, while the radio bearer service handles reliable user data transmissions between the terminal 10 and the UTRAN 100.

The data service provided to a particular terminal 10 is divided into circuit switched (circuit exchanged) service and packet switched (packet exchanged) service. For example, typical voice telephone service falls under circuit switched service, while web-browsing service via an Internet connection is classified as packet switched service.

To support circuit switched service, the RNC 111,121 connects with the MSC 210 of the core network 200, and the MSC 210 connects with the GMSC 220 that manages connections coming from or going out to other networks.

For packet switched service, the SGSN 230 and the GGSN 240 of the core network 200 provide appropriate services. For example, the SGSN 230 supports the packet communication going to the RNC 111,121, and the GGSN 240 manages the connection to other packet switched networks, such as an Internet network.

II. Various UTRAN interfaces

Between various network structure elements, there exists an interface that allows data to be exchanged for communication therebetween. The interface between the RNC 111,121 and the core network 200 is defined as the Iu interface. The Iu interface is referred to as "Iu-PS" if connected with the packet switched domain, and referred to as "Iu-CS" if connected with the circuit switched domain.

Various types of identifiers are required to maintain proper connections between the terminals 10 and the network (UTRAN 100 and core network 200). A description regarding a radio network temporary identifier (RNTI) will be made hereblow. The RNTI uses identification (discrimination) data of the terminal 10 while a connection between the terminal 10 and the UTRAN 100 is maintained. To do so, four types of RNTI, namely, a serving RNC RNTI (S-RNTI), a drift RNC RNTI (D-RNTI), a cell RNTI (C-RNTI), and a UTRAN RNTI (U-RNTI) are defined and used.

The S-RNTI is allocated by a servicing RNC (SRNC) when a connection between the terminal 10 and the UTRAN 100 is established, and this becomes the data that allows discernment of the corresponding terminal 10 by the SRNC. The D-RNTI is allocated by a drift RNC (DRNC) when handovers between RNCs 111,121 occur in accordance with the movement of the terminal 10. The C-RNTI is the data that allows discernment of a terminal 10 within the controlling RNC (CRNC), and a terminal 10 is allocated a new C-RNTI value from the CRNC whenever the terminal 10 enters a new cell. Finally, the U-RNTI comprises an SRNC identity and an S-RNTI, and because the SRNC manages the terminal 10 and because discernment data of a terminal 10 within the corresponding SRNC can be known, the U-RNTI can thus be considered to provide the absolute discernment data of a terminal 10.

When transmitting data using a common transport channel, a C-RNTI or a U-RNTI is included in the header of the medium access control (MAC) protocol data unit (MAC PDU) at the MAC-c/sh layer. At this time, a UE identification (ID) type indicator, indicating the type of RNTI that was included, is also included together in the header of the MAC PDU.

For UMTS Terrestrial Radio Access (UTRA), there are typically two types of physical layer signaling methods, namely, TDD (Time-Division Duplex) and FDD (Frequency-Division Duplex). The UTRA FDD radio interface has Logical channels, which are mapped to Transport channels, which are again mapped to Physical channels. Logical channel to Transport channel conversion happens in the MAC (Medium Access Control) layer, which is a lower sub-layer in the Data Link Layer (Layer 2).

In the downlink (DL: from network to terminal), three different types of Transport channels are typically available for data packet transmission, namely the DCH (Dedicated CHannel), the DSCH (Downlink Shared CHannel) and the FACH (Forward Access CHannel).

The DCHs are assigned to single users through set-up and tear down procedures and are subject to closed loop power control that, if used for circuit service such as voice, stabilizes the BER (bit error rate) and optimizes CDMA performance.

The DSCH is a shared channel on which several users can be time multiplexed. No set-up and tear down procedures are required and the physical channel on which the DSCH is mapped does not carry power control signaling. However, since closed loop power control is still required, users that are allowed to access DSCH services must have an associated DCH that is active. The DCH, if not already active due to another transport service, must be activated just to allow the access to the DSCH and to carry physical layer signaling only.

The FACH is shared by several users to transmit short bursts of data, but, unlike the DSCH, no closed-loop power control is exerted and no associated DCH must be activated to access this channel.

For each one of the above channels, different combinations of spreading factor (SF) and code rate can provide the bandwidth and the protection required for different data services and communication environments.

III. UTRAN Protocol Structure

FIG. 2 illustrates a radio access interface protocol structure between the terminal 10 and UTRAN 100 that is based upon the 3GPP wireless access network standards. Here, the radio access interface protocol has horizontal layers including a physical layer, a data link layer and a network layer, and has a user plane for transmitting data information and a control plane for transmitting control signals arranged vertically.

The user plane is a region to which traffic information of a user, such as voice or an Internet-protocol (IP) packet, is transmitted. The control plane is a region to which control information, such as an interface of a network or maintenance and management of a call, is transmitted.

In FIG. 2, protocol layers can be divided into a first layer (L1), a second layer (L2) and a third layer (L3) based upon the three lower layers of an open system interconnection (OSI) standard model that is well-known in the art of communication systems. Each layer shown in FIG. 2 will now be described.

The first layer (L1) uses various radio transmission techniques to provide information transfer service to the upper layers. The first layer (L1) is connected via a transport channel to a MAC (medium access control) layer located at a higher level (precedence), and the data between the MAC layer and the physical layer is transferred via this transport channel.

Data is transmitted according to a transmission time interval (TTI) through the transport channel. The physical channel transfers data upon division into certain units of time, called frames. In order to synchronize the transport channel between the UE (terminal 10) and the UTRAN 100, a connection frame number (CFN) is used. For the transport channels, with the exception of the paging channel, the range of the CFN value is between 0 to 255. That is, the CFN is repeated (circulated) by a period of 256 frames.

Besides the CFN, a system frame number (SFN) is also used to synchronize the physical channel. The SFN value has a range of 0 to 4095 and is thus repeated (circulated) by a period of 4096 frames.

The MAC layer provides a re-allocation service of MAC parameters for allocation and re-allocation of radio (wireless) resources. The MAC layer is connected to an upper layer called a RLC (radio link control) layer through a logical channel, and various logical channels are provided according to the type of transmitted information. In general, when information of the control plane is transmitted, a control channel is used. When information of the user plane is transmitted, a traffic channel is used.

The MAC layer is divided into a MAC-b sublayer, a MAC-d sublayer, and a MAC-c/sh sublayer, according to the type of transport channel being managed. The MAC-b sublayer manages a broadcast channel (BCH) handling the broadcast of various data and system information.

The MAC-c/sh sublayer manages a shared transport channel, such as a forward access channel (FACH), a downlink shared channel (DSCH), or the like, that one terminal shares with other terminals. In the UTRAN 100, the MAC-c/sh sublayer is located in a controlling RNC (CRNC) and manages channels shared by all terminals in a cell, so that one MAC-c/sh sublayer exists for each cell. A MAC-c/sh sublayer also exists in each terminal 10, respectively.

The MAC-d sublayer manages a dedicated channel (DCH), which is a dedicated transport channel for a specific terminal 10. Accordingly, the MAC-d sublayer is located in a serving RNC (SRNC) that manages a corresponding terminal 10, and one MAC-d sublayer also exists in each terminal 10.

A radio link control (RLC) layer provides support for reliable data transmission, and may perform a function of segmentation and concatenation of an RLC service data unit (SDU) coming from a higher layer. The RLC SDU transferred from the higher layer is adjusted in its size according to a throughput capacity at the RLC layer, to which header information is added, and is then transferred to the MAC layer in the form of a protocol data unit (PDU), i.e., a RLC PDU. The RLC layer includes an RLC buffer for storing the RLC SDU or the RLC PDU coming from the higher layer.

The RLC layer may be part of the user plane or the control plane in accordance with an upper layer connected thereto. The RLC layer is part of the control plane when data is received from the RRC layer (explained hereafter), and the RLC layer is part of the user plane in all other instances.

A packet data convergence protocol (PDCP) layer is located at an upper layer from the RLC layer, allowing data to be transmitted effectively on a radio interface with a relatively small bandwidth through a network protocol, such as the IPv4 or the IPv6. For this purpose, the PDCP layer performs the function of reducing unnecessary control information used in a wired network, and this function is called, header compression.

Various types of header compression techniques, such as RFC2507 and RFC3095 (robust header compression: ROHC), which are defined by an Internet standardization group called the IETF (Internet Engineering Task Force), can be used. These methods allow transmission of only the absolutely necessary information required in the header part of a data, and thus transmitting a smaller amount of control information can reduce the overall amount of data to be transmitted.

As can be understood from FIG. 2, in case of the RLC layer and the PDCP layer, a plurality of entities may exist in a single layer thereof. This is because one terminal may have many radio (wireless) carriers, and typically, only one RLC entity and one PDCP entity is used for each radio carrier.

A broadcast/multicast control (BMC) layer performs the functions of scheduling a cell broadcast (CB) message transferred from the core network 200 and of broadcasting the CB message to UEs positioned in a specific cell or cells. At the UTRAN 100, the CB message transferred from the upper layer is combined with information, such as a message ID (identification), a serial number, a coding scheme, etc., and transferred to the RLC layer in the form of a BMC message and to the MAC layer through a common traffic channel (CTCH), which is a logical channel. The logical channel CTCH is mapped to a transport channel (i.e., a forward access channel (FACH)), and to a physical channel (i.e., a secondary common control physical channel (S-CCPCH)).

The radio resource control (RRC) layer located at the lowest portion of the third layer (L3) is only defined in the control plane, and controls the transport channels and the physical channels in relation to the setup, the reconfiguration, and the release (cancellation or tear down) of the radio bearers (RBs). Here, the RB refers to a service provided by the second layer (L2) for data transmission between the terminal 10 and the UTRAN 100. In general, the set up of the RB refers to the process of stipulating the characteristics of a protocol layer and a channel required for providing a specific data service, and setting the respective detailed parameters and operation methods therefor.

Among the RBs, the RB used for exchanging an RRC message or a NAS (Non-Access Stratum) message between a particular terminal 10 and the UTRAN 100 is called a SRB (Signal Radio Bearer). If a SRB is established between a particular terminal 10 and the UTRAN 100, an RRC connection exists between the terminal 10 and the UTRAN 100. A terminal 10 having an RRC connection is said to be in a RRC connected mode, while a terminal 10 without an RRC connection is said to be in idle mode. A terminal 10 in an RRC connected mode is classified, depending upon the channel received, into the states comprising, Cell_PCH or URA_PCH, Cell_FACH, Cell_DCH.

For a terminal 10 in the Cell_DCH state, a dedicated logical channel and a transport channel DCH are established, and the DCH is always received. If a DSCH has been established, the DCH and the DSCH can be received together. For a terminal 10 in the Cell_FACH state, a dedicated logical channel and a transport channel FACH are established, and FACH data can always be received. In the Cell_FACH state, DCH and DSCH cannot be received. For a terminal 10 in the Cell_PCH and URA_PCH states, a dedicated logical channel has not been established. However, in this state, a paging message via the PCH, or a CBS (cell broadcast service) message via the FACH can be received.

Here, URA (UTRAN Registration Area) is an area defined by one or more cells, and provides an efficient method for supporting the mobility of the terminal 10. When a terminal 10 is in the URA_PCH state, the UTRAN 100 does not know which cell the corresponding terminal 10 is located in, but it can be discovered as to which URA region the terminal 10 is located in. Thus, when performing paging, a paging message is transmitted to all cells, which are part of a particular URA region. In contrast, if the terminal 10 is in the Cell_PCH state, because the UTRAN 100 can determine the cell that the terminal 10 is located in, paging messages are only transmitted to those particular cells having a terminal 10 existing therein.

Next, the downlink shared channel (DSCH) will be described in more detail. The DSCH is used to carry dedicated control information or traffic data to a plurality of users who share the channel. Code multiplexing is performed for the plurality of users so that a single channel may be shared. Thus, the DSCH can be defined by a series of code sets.

Unlike in the uplink, the downlink suffers from a code deficiency (i.e., code shortage) problem. This is because there is a limit on the number of codes that a cell can have for a single base station (Node-B). This is related to a spreading factor (SF), and the number of physical channels decreases as the data transmission rate increases. Also, certain types of data services exhibit data burst characteristics. Thus, when only a single channel is allocated continuously, efficient use of codes becomes difficult. Namely, if the DCH is used to carry data having burst characteristics, code shortage problems occur.

To address this problem, a plurality of scrambling codes may be used. However, the use of scrambling codes cannot increase code usage efficiency, and the complexity of the receiving end is undesirably increased.

Alternatively, a method of commonly using (i.e., sharing) a single channel is used, and to do so, code multiplexing is employed. For the physical channel, the basic transmission unit is called a radio frame. Code allocation is performed for each and every radio frame. Thus, a channel code for the physical channel of the DSCH is varied for each and every radio frame.

A physical downlink shared channel (PDSCH), which is a type of physical channel, is used to transport a transport channel, i.e., a DSCH. Namely, the PDSCH is used to carry the DSCH, i.e., the PDSCH is mapped to the DSCH. One PDSCH corresponds to one channelization code. One PDSCH radio frame is allocated to only one particular UE (terminal). The radio network allocates a respectively different PDSCH to a respectively different UE for each radio frame. More than one PDSCH, each having the same SF for a particular radio frame, may be allocated to one particular UE. Each PDSCH is correlated with (i.e., is associated with) one dedicated physical channel (DPCH) and operates for each and every radio frame. Such correlated DPCHs are called associated DPCHs.

The PDSCH and the associated DPCH need not have the same SF. The PDSCH cannot transport physical layer control information, such as Pilot (pilot control), TFCI (Transport-Format Combination Indicator), TPC (Transmitter Power Control), thus all physical layer control information related to the DSCH are carried via a downlink physical control channel (DPCCH) that constitutes an associated DPCH. The UE can decode the DSCH by using the TFCI Field 2 (TFCI2) data carried via the associated DPCH.

Macrodiversity is not applied to the DSCH, and the DSCH is transmitted from only one particular cell. Here, it is understood that "macrodiversity" refers to enabling a mobile station (UE) to communicate with the fixed network by more than one radio link, i.e. a mobile (UE) can send/receive information towards/from more than one radio port (or base station (Node-B)).

UMTS has several different time slot configurations depending upon the channel being used. In the 3GPP standard, a basic transmission unit of the physical channel is a radio frame. The radio frame has a length of 10 ms and is comprised of 15 time slots. Each time slot has fields for transmitting various data bits, such as TFCI. For example, in DPCH downlink and uplink time slot allocation, each slot may have TCP (Transmit Power Control), FBI (Feedback Information) used for closed loop transmission diversity, TFCI containing information related to data rates, and pilot bits, which are always the same and are used for channel synchronization.

FIG. 3 illustrates a channel coding method for a TFCI that is transmitted via the associated DPCH. In general, TFCI (which is 10-bit data) are encoded into 30-bit data through channel coding, and transmitted via a TFCI field in each and every frame. However, for the DPCH, which is an associate or a counterpart (complement) to the DSCH, TFCI division (partition) mode channel coding is employed as shown in FIG. 3. Here, the 5-bit data at each input terminal refers to a first TFCI field data and a second TFCI field data, respectively. The first TFCI field provides the transmission format association data of the transport channel DCH that is mapped to the DPCH. In contrast, the second TFCI field provides the transmission format association data of the associated DSCH, and the channel code data. Each of the 5-bit TFCI field data is encoded into two 16-bit TFCI code words via the respectively different bi-orthogonal code encoders. The data that has been encoded into two 16-bit TFCI code words through channel coding, is mixed together with one TFCI field that constitutes a radio frame and then arranged (distributed).

FIG. 4 illustrates a protocol model for the DSCH when there is an Iur interface, which is an interface between the SRNC and the CRNC. On the downlink, logical channels that are mapped to the DSCH include a DTCH (dedicated traffic channel) that is used to carry data for a particular UE, and a DCCH (dedicated control channel) that is used to carry signaling data (e.g., RRC messages) for a particular UE. In practical use, the DSCH is mainly used for carrying DTCH data. The RLC modes for the DSCH include an answer mode or a non-answer mode. The DSCH always operates together with one or more DL DCHs (downlink dedicated channels).

The DSCH data transmission scheduling is performed by the MAC-c/sh of the CRNC. The DSCH frame protocol (FP), by adding a header to the MAC-c/sh PDU, creates a DSCH FP PDU that is then transferred to the base station (Node-B).

The DSCH is allowed to transfer to the corresponding terminals (UE), PDSCH OVSF (orthogonal variable spreading factor) code allocation data that are performed at the MAC-c/sh, by employing the TFCI codeword of the associated DPCCH. This is advantageous in efficiently using radio (wireless) resources, for packet data that have a high peak data rate but a relatively low activity cycle. The MAC-c/sh of the CRNC temporarily allocates OVSF (orthogonal variable spreading factor) codes of the PDSCH to the user for each and every frame, whenever packet data transmissions are requested.

FIG. 5 illustrates a DSCH data transfer procedure used in the DSCH FP of the Iub interface, which is an interface between a Node-B and a CRNC. This procedure is used when DSCH data frames are transmitted from the CRNC to the base station (Node-B). The Iub DSCH data stream contains data that is transmitted on a single DSCH for a single UE. For one UE, one or more Iub DSCH data streams may exist. A single Iub user plane transport bearer transmits only one DSCH data stream. Here, a transport bearer refers to a carrier of a wired network existing within the UTRAN that provides data transmission services between an RNC and a base station, or between two different RNCs.

IV. Providing MBMS to Users

Multimedia broadcast/multicast service (MBMS) is a service to provide multimedia data (e.g., audio, images, video) to a plurality of terminals (users) by using a uni-directional point-to-multipoint bearer service. MBMS was newly developed because of the shortcomings in the related art 3GPP wireless access network standards described above. In particular, the related art techniques for establishing various channels and protocol execution have certain limitations and disadvantages in providing multimedia services to users.

For example, employing CBS messages (previously described) is problematic for the following reasons. First, the maximum length of a CBS message is restricted to 1230 octets. Thus, this is not appropriate for use in broadcasting or multicasting multimedia data. Second, because a CBS message is only broadcast to all terminals within a cell, the multicasting of data via a wireless (radio) interface to provide data services to only a particular group of users (terminals) is not possible.

In general, "multicast" refers to transmitting (propagating) data to a specified group of users connected to a local area network (LAN) or the Internet, whereby one user transmits data to a few users, who each then transmit the received data to a plurality of users using a bucket relay method. Unlike "unicast," which is the transmission of data to one specified user, or "broadcast," which is the transmission of data to an unspecified plurality of users, multicast is the transmission of data to a specified plurality of users.

In UMTS, the multimedia services to be provided to users are based upon packet switching and Internet access. MBMS refers to a downlink transmission service for providing data services such as, streaming data services (e.g., multimedia, video on demand, webcast) or background data services (e.g., e-mail, short message services (SMS), downloading), to a plurality of terminals by employing a common (dedicated or exclusive) downlink channel.

MBMS can be classified into a broadcast mode and a multicast mode. The MBMS broadcast mode refers to transmitting multimedia data to all users within a broadcast area, whereby a broadcast area refers to a region where broadcast service is possible. Within a single PLMN (public land mobile network), which is any wireless communications system intended for use by terrestrial subscribers in vehicles or on foot, more than one broadcast region may exist, and more than one broadcast service may be provided in one broadcast region. Also, a single broadcast service may be provided to many broadcast regions. The related art procedures for users to receive a certain broadcast service are as follows.

(1) Users receive a service announcement provided by the network. Here, a service announcement refers to providing to the terminal, an index and any related information of the services to be provided.

(2) The network establishes a bearer for the corresponding broadcast service.

(3) Users receive service notification provided by the network. Here, service notification refers to notifying the terminal of the information regarding the broadcast data to be transmitted.

(4) Users receive the broadcast data transmitted from the network.

(5) The network releases the bearer for the corresponding broadcast service.

The MBMS multicast mode refers to the service for transmitting multicast data to a particular user (terminal) group within a multicast area. Here, a multicast area refers to a region where multicast service is possible. Within a single PLMN, more than one broadcast region may exist, and more than one broadcast service may be provided in one broadcast region. Also, a single broadcast service may be provided to many broadcast regions. The related art procedures for users to receive a certain multicast service are as follows.

(1) A user must first subscribe to a multicast subscription group. Here, subscribing refers to establishing a relationship between the service provider and the user (subscriber). A multicast subscription group refers to a group of users who have completed the subscription process.

(2) Users who subscribed to the multicast subscription group receive a network announcement provided by the network. Here, a service announcement refers to providing to the terminal, an index and any related information of the services to be provided.

(3) A user who subscribed to a multicast subscription group must join a multicast group in order to receive a particular multicast service. Here, a multicast group refers to a group of users receiving a particular multicast service. Joining refers to one user merging with the other users in a multicast group who congregated to receive a particular multicast service. Joining is also referred to as MBMS multicast activation. Thus, a user can receive particular multicast data through MBMS multicast joining or activation.

(4) The network establishes a bearer for the corresponding multicast service.

(5) A user who joined a multicast group receives service notification provided by the network. Here, service notification refers to notifying the terminal of the information regarding the broadcast data to be transmitted.

(6) Users receive the multicast data transmitted from the network.

(7) The network releases the bearer for the corresponding broadcast service.

MBMS user data (i.e., control information and content data) is transmitted from the RNC 111,121 to the terminal 10 via a base station (Node-B) by employing services of the user plane of the UTRAN protocol. Namely, the services of the PDCP, RLC, and MAC layers in the user plane, and services of the physical plane are employed to transmit the MBMS user data from the RNC to the terminals (UE) via the base station (Node-B). More particularly, the MBMS user data that is transferred from the CN (core network 200) undergoes header compression at the PDCP layer, and then is transferred to the RLC UM entity via the RLC UM SAP. The RLC UM entity then transfers the data to the MAC layer via a logical channel, i.e., a common (shared) traffic channel. The MAC layer adds a MAC header to the received data and transfers the data to the physical layer in the base station (Node-B) via a common (shared) transport channel. Finally, after further processing, such as coding and modulation at the base station (Node-B) physical layer, data transmission to the terminals via a common (shared) physical channel is performed.

An MBMS RB, which is a radio bearer (RB) for the MBMS, serves to transmit user data of one specific MBMS, transferred from the core network 200 to the UTRAN 100, to a specific terminal group. The MBMS RB is divided into a point-to-multipoint RB and a point-to-point RB.

In order to provide MBMS, the UTRAN 100 selects one of the two types of MBMS RBs. In order to select the MBMS RB, the UTRAN 100 recognizes the number of users (terminals 10) for the specific MBMS existing in one cell. The UTRAN 100 internally sets a threshold value, and if the number of users existing in a cell is smaller than the threshold value, the UTRAN 100 sets a point-to-point MBMS RB, whereas if the number of users existing in a cell is greater than the threshold value, the UTRAN 100 sets a point-to-multipoint MBMS RB.

SUMMARY OF THE INVENTION

One aspect of the invention involves the recognition of the drawbacks, problems, and disadvantages of the related art. Namely, the inventors of the present invention recognized certain problems and disadvantages related to transmitting an MBMS service, which provides the same data to a plurality of particular terminals (users), via the DSCH of the related art or other channels used for packet data transmissions.

In the related art DSCH, the RLC and MAC-d layers needed for transmitting user data are all located within the SRNC. Also, the downlink data of the MAC-d is transferred to the MAC-c/sh of the CRNC. As the DSCH is a channel that is shared by many users, a single DSCH carries data for a plurality of terminals. The data for each terminal is transferred to a common CRNC from a SRNC (located in Layer 2) required for each terminal. Here, the data of each SRNC are for respectively different data services, and thus must be transferred to different corresponding terminals.

However, when providing MBMS, a plurality of SRNCs for a single terminal group, transfer the same data to the CRNC. Thus, a plurality of RLC and MAC-d layers exist within each and every SRNC for transmitting the same service data. Furthermore, the same data needs to be transmitted over the Iur interface, which is undesirably repetitive. As such, the processing capabilities of the RNC CPU, the capacity of memory devices, radio (wireless) communication network resources, and the like are undesirably wasted. Such related art problems and disadvantages only increase with the number of multimedia services that need to be provided to the users based upon ever increasing consumer demands.

In order to overcome the problems that may occur when transmitting data via a related art DSCH, the present invention proposes to provide a RLC layer within the CRNC to allow multicast data via a "point-to-multipoint DSCH" (explained below). Here, the data to be transmitted via the DSCH does not pass through the MAC-d layer, but is transferred directly from the RLC to the MAC-c/sh layer. By transmitting the same service data to a plurality of terminals via the DSCH using this method, the RLCs for the corresponding service are not repetitively provided in the SRNC, but only exist only in the CRNC and thus UTRAN resources can be efficiently used.

The DSCH of the present invention provides point-to-multipoint radio bearer services, and allows transmission of data for a common traffic channel (such as a CTCH) to a particular terminal group. Namely, the radio (wireless) system establishes a downlink shared channel (DSCH) to multicast a plurality of services, and a particular multicast service is provided to only a particular terminal group during a particular radio frame of the DSCH. Here, for the particular terminal group wishing to receive a multicast service via the DSCH, the radio system establishes a DCH (dedicated channel) for each terminal and provides DSCH control information to each terminal. The DSCH control information includes information whether a terminal should receive a particular radio frame of the downlink shared channel, the channel codes used in the PDSCH, the size of the data to be transmitted in the particular radio frame, decoding data, and the like.

In the present invention, the DSCH providing point-to-multipoint radio bearer services is referred to as a "point-to-multipoint DSCH" to distinguish over the related art DSCH. On the other hand, if the DSCH is used to provide a point-to-point radio bearer service, it is referred to as a "point-to-point DSCH." Also, in the present invention, a DSCH includes a high speed downlink shared channel (HS-DSCH) so that a DSCH can be replaced by a HS-DSCH.

Additionally, in a related art radio (wireless or mobile) communication system employing a common transport channel to provide multimedia broadcast or multicast service (MBMS), the greatest problem in providing various types of MBMS to one cell is the fact that the transmission power required for one MBMS takes up a large proportion of the overall power amount used by the base station (i.e., Node-B in UMTS).

Accordingly, when MBMS is provided by the UTRAN, the factor that must be primarily considered is minimizing the transmission power required for the particular MBMS in order to maximize the number of data services that can be provided by the base station (Node-B).

When a point-to-multipoint MBMS RB is provided by the related art, a common transport channel, such as FACH or DSCH, may be used. However, these common transport channels have the following drawbacks and problems related to not being able to efficiently provide MBMS with respect to transmission power.

First, the problems associated with providing MBMS via a FACH will be considered. In the related art FACH, once a downlink channel code has been set, it cannot be changed or converted on demand. Namely, because the spreading factor cannot be varied, discontinuous transmissions (DTX) (i.e., not transmitting data for a prescribed period of time) were performed. Although discontinuous transmissions can be applied when the amount of data changes from time to time, doing so is disadvantageous because the amount of power required in transmitting data is undesirably high.

Next, problems and disadvantages when providing MBMS via a DSCH will be explained. In the related art, an associated DPCH must be established (created) so that the DSCH can be used to carry power control and other control information. When transmitting data via a DSCH to a plurality of terminals, a plurality of associated DPCHs must be created in order to provide a single data service, such as MBMS. Considering the power amount requirements for transmitting a plurality of associated DPCHs, providing MBMS through a related art method employing DSCH is inefficient.

Accordingly, an object of the present invention is to provide a communication scheme for channel code control information in a radio (wireless) communication system. This is achieved by using a newly created physical downlink shared channel for data (referred to as D-PDSCH hereinafter) that transmits only data without any physical layer control information such as pilot bits and power control bits. The D-PDSCH employs a variable spreading with orthogonal variable spreading factor codes or link adaptation techniques that adaptively control modulation and coding according to channel conditions or radio resources.

Also, a newly created physical downlink shared channel for control (referred to as C-PDSCH hereinafter) is employed to carry the control information related with the D-PDSCH, so that the efficiency of data transmissions for MBMS is improved.

The wireless mobile communication system according to the present invention includes a channel structure having a D-PDSCH that supports at least one multicast service for a plurality of terminals, and a C-PDSCH that employs a different channel code than that of the D-PDSCH and that allows multicasting of control information for the multicast service to the plurality of terminals.

The C-PDSCH allows broadcasting and multicasting of control information for respectively different broadcast or multicast services during respectively different time periods. Also, the C-PDSCH is for notifying a particular terminal or terminal group as to whether they should receive data during a prescribed time period of the D-PDSCH.

Control information refers to information that is necessary for a terminal to receive the D-PDSCH (e.g., the channel code numbers or the spreading factor channel code numbers of the D-PDSCH or the like). Also, the control information that is transmitted during a certain time period of the C-PDSCH, is the control information to be used during a certain time period of the D-PDSCH, whereby the two time periods have a prescribed time difference (delay) between them. Typically, the time periods of the D-PDSCH and the C-PDSCH can be one radio frame. Also, of the various corresponding radio frames for the C-PDSCH, specialized fields, such as a TFCI field may be used.

Thus, to achieve these and other advantages and in accordance with the purpose of the invention, as embodied and broadly described herein, the present invention is directed to providing radio (wireless or mobile) data services, such as multimedia broadcast and multicast services (MBMS), in a radio (wireless or mobile) communication system, such as a universal mobile telecommunication system (UMTS), by modifying (augmenting) certain existing radio communication protocols while employing a new transport channel (a point-to-multipoint DSCH), and/or by establishing new physical downlink shared channels (C-PDSCH and D-PDSCH) to substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention.

In the drawings.

DETAILED DESCRIPTION OF THE PREFERRED EMBODIMENTS

Reference will now be made in detail to various embodiments of the present invention, examples of which are illustrated in the accompanying drawings. Wherever possible, the same reference numbers will be used throughout the drawings to refer to the same or like parts.

The present invention can be implemented in a radio (wireless or mobile) communication system such as UMTS (Universal Mobile Telecommunication System) developed by the 3GPP. However, without being restricted thereto, the present invention can be also applied to or modified to accommodate other radio (wireless) communication systems operating under different standards.

Also, it should be noted that the present invention is applicable to HSDPA (high-speed downlink packet access) and other concepts that aim to increase packet data throughput. The following description will focus on a radio access network employing a DSCH merely for exemplary purposes. However, applicability of the present invention to HSDPA techniques is feasible and understood, because the concepts involved are similar. For example, similar to the DSCH, an HS-DSCH is a transport channel carrying the user data with HSDPA operation.

I. Providing MBMS by Employing a Point-to-Multipoint DSCH

Figure 6:
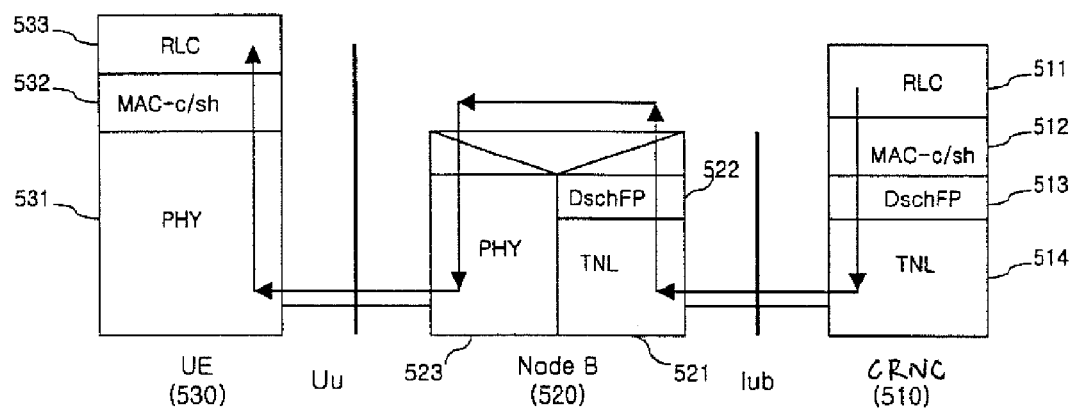
FIG. 6 illustrates a signal flow diagram of a data transmission process for a point-to-multipoint DSCH via an Iub interface according to an embodiment of the present invention.

FIG. 6 illustrates a radio protocol structure for a point-to-multipoint DSCH according to an embodiment of the present invention. As shown, the CRNC 510 is formed such that when data is transported via a point-to-multipoint DSCH of the present invention, the data is transferred by the RLC 511 to the MAC-c/sh 512, and the passes through the DSCH FP and the TNL, and transported to the base station (Node-B) 520, which then transmits to a terminal (UE) 530.

The point-to-multipoint DSCH of the present invention, unlike the related art DSCH, does not have a corresponding radio protocol entity in the SRNC. Also, the MAC and RLC entities only exist in the CRNC 510. Here, the RLC can operate in a transparent or non-transparent mode, whereby the non-responsive mode is more preferable.

When data to be transmitted in the multicast service is generated at the CRNC 510, the CRNC RLC layer 511 inserts a non-transparent header for the received PDCP PDU to form a RLC PDU. This RLC PDU is then transferred to the CRNC MAC layer 512 via a logical channel. The CRNC MAC layer 512 forms a MAC PDU by inserting a MAC header. The MAC layer 512 performs a transmission scheduling based upon the priority of the MAC PDU, forms the necessary DSCH control information, and transfers the MAC PDU and the DSCH control information to the physical layer in the base station (Node-B) 520 by using the frame protocol layer services. The base station physical layer respectively transmits the DSCH control information to each and every terminal within the terminal group via a DCH, and multicasts the MAC PDU after encoding, to the particular terminal group via the DSCH.

The physical layer 531 of each terminal 530 in the terminal group receives the DSCH control information via the DCH, and determines whether to receive the point-to-multipoint DSCH during a particular radio frame in accordance with the content of the received DSCH control information. If the DSCH control information indicates that the point-to-multipoint DSCH should be received, the physical layer 531 of the terminal 530 receives the point-to-multipoint DSCH during a particular radio frame by using the DSCH control information, decodes and then transfers the MAC PDU to the MAC layer 532 in the terminal 530 via a transport channel. Then, the terminal MAC layer 532 removes the inserted MAC header of the received MAC PDU, and transfers the RLC PDU to the RLC layer of the terminal. The terminal RLC layer removes the header from the received RLC PDU and transfers it to the PDCP layer of the terminal for processing.

Next, the data transmission process for a point-to-multipoint DSCH that includes an Iub region will be explained. The CRNC 510 MAC 512 forms a DSCH transmission block, and transfers it to the DSCH FP layer 513 of the RNC. The RNC DSCH FP attaches the DSCH control information to the MAC PDU to form a DSCH data frame, which is then transferred to the TNL (transport network layer) 514. Here, the DSCH control information included in the DSCH data frame comprises PDSCH channel code data that is determined at the MAC 512 and transmission format association data. The RNC transfers the DSCH data frames to the base station 520 via a transmission bearer provided from the TNL 514. Here, the transmission bearer of the Iub transmits only the data for a particular MBMS. Thus, for MBMS, the Iub transmission bearer is used for transmitting data of a particular multicast group or a particular MBMS service.

The TNL 521 of the base station 520 transfers the received DSCH data frame to the DSCH FP 522. The DSCH FP 522 of the base station transfers the DSCH transmission block and the DSCH control information included in the received DSCH data frame, to the physical layer 523 of the base station. The physical layer 523 of the base station uses the channel codes included in the DSCH control information to transmit MBMS data to the terminal via the PDSCH, which is a physical channel. Also, the channel code data and the transmission format association data included in the DSCH control information are transferred to the corresponding terminal group via the TFCI field of the associated DPCCH. If the TFCI field of the PDSCH radio frame indicates that reception should be made, the terminal within the terminal group receives the corresponding PDSCH radio frame, performs decoding and then transfers a transmission block to the MAC layer 533 of the terminal. The terminal MAC layer 532 removes the MAC header from the corresponding MAC PDU, and transfers to the RLC layer 533 of the terminal via a CTCH. Accordingly, the data transmission flow for a point-to-multipoint DSCH that includes an Iub region is shown by the arrows in FIG. 6. In the present invention, the CTCH can be replaced by the MBMS traffic channel (MTCH).

The present invention provides in an embodiment thereof, a method of providing multicasting services to a plurality of users in radio communication, whereby the method comprises the steps of establishing three or more data transmission states (e.g., States A, B, and C), employing two or more state transition conditions to change or maintain the data transmission state, and providing data of the multicasting service to the user with a particular data transmission state determined by the state transition conditions.

Regarding the above method assuming there are three data transmission states, two of the states relate to a dedicated channel and the remaining state pertains to a forward access channel. In particular, of the two states that relate to a dedicated channel, one state is based upon point-to-point data transmission, and the other state is based upon point-to-multipoint data transmission.

Also, one data transmission state can transition directly to another data transmission state in accordance with the transition conditions. In other words, in the above situation assuming three states (States A, B, and C), a transition can occur from State A "directly" to State B, without going through State C. Likewise, a transition can occur from State A "directly" to State C, without going through State B.

Here, some examples of the transition conditions include a total number of users, and parameters for radio communication resources. It can be understood that many other types of transition conditions may be employed as desired.

Figure 7:
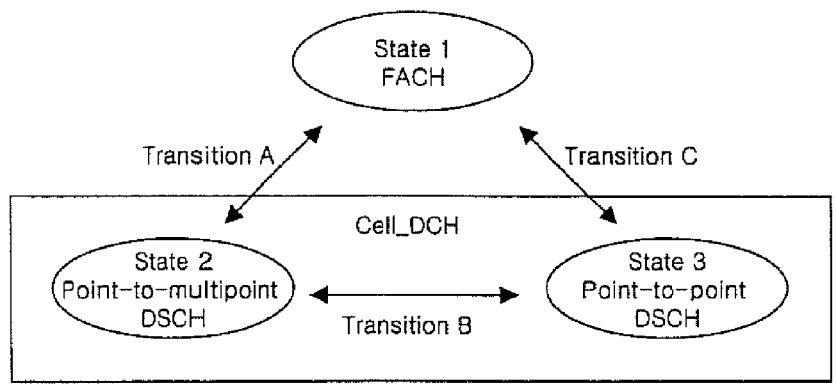
FIG. 7 illustrates is state transition diagram when MBMS is provided via a FACH and a DSCH according to an embodiment of the present invention.

FIG. 7 illustrates a state transition diagram when MBMS service is provided via a FACH or a point-to-multipoint DSCH according to an embodiment of the present invention.

State 1 is the state where a point-to-multipoint MBMS radio bearer service is provided via the FACH. Namely, logical channel CTCH data is transmitted via the FACH. Here, those terminals having a RRC connection can receive the CTCH data via the FACH when the terminal is in a Cell_DCH, a Cell_FACH, a Cell_PCH, and a URA_PCH state.

State 2 is the state where a point-to-multipoint MBMS radio bearer service is provided via the point-to-multipoint DSCH. For those terminals having a point-to-multipoint DSCH established thereto, a DCH is also established. Thus, only those terminals in a Cell_DCH state can receive the point-to-multipoint DSCH. However, the DCH is not used in transmitting point-to-multipoint MBMS data.

State 3 is the state where a point-to-point MBMS radio bearer service is provided via the DCH. This state is the same as the Cell_DCH state of the related art. If the number of users in a particular cell receiving the MBMS is relatively small, the MBMS service is provided via a small number of DCHs. Here, a point-to-point DSCH of the related art (which is distinct from a point-to-multipoint DSCH) can be established together with the DCH. A point-to-point DSCH, as in the related art, allows transmission of data of an RLC entity such as a DCH, so the same MBMS can be transmitted via a DCH or a point-to-point DSCH.

The reasons why transitions from one state to another state occur will be explained. Regarding transition A, the terminal in State 2 can transition to State 1 if the transmission power required for transmitting a particular MBMS is smaller than a particular threshold value. In contrast, it is more advantageous with respect to transmission power usage for a terminal to transition from State 1 to State 2 if the transmission power is larger than the particular threshold value.

For transition B, the terminal in State 2 can transition to State 3 if the number of terminals wishing to receive a particular MBMS is smaller than a particular threshold value. In contrast, the terminal can transition from State 3 to State 2 if the number of terminals is larger than the particular threshold value. Also in transition B, the terminal in State 2 can transition to State 3 if the number of codes required for transmitting a particular MBMS is smaller than a particular threshold value. In contrast, the terminal can transition from State 3 to State 2 if the number of codes is larger than the particular threshold value. This is because it is more advantageous with respect to the number of codes to be used, when the DSCH is employed.

Transition C can be performed for the same reasons as those for Transition B explained above. Namely, the terminal in State 1 can transition to State 3 if the number of terminals wishing to receive a particular MBMS is smaller than a particular threshold value. In contrast, the terminal can transition from State 3 to State 1 if the number of terminals is larger than the particular threshold value. Also in transition C, the terminal in State 1 can transition to State 3 if the number of codes required for transmitting a particular MBMS is smaller than a particular threshold value. In contrast, the terminal can transition from State 3 to State 1 if the number of codes is larger than the particular threshold value.

Figure 8:
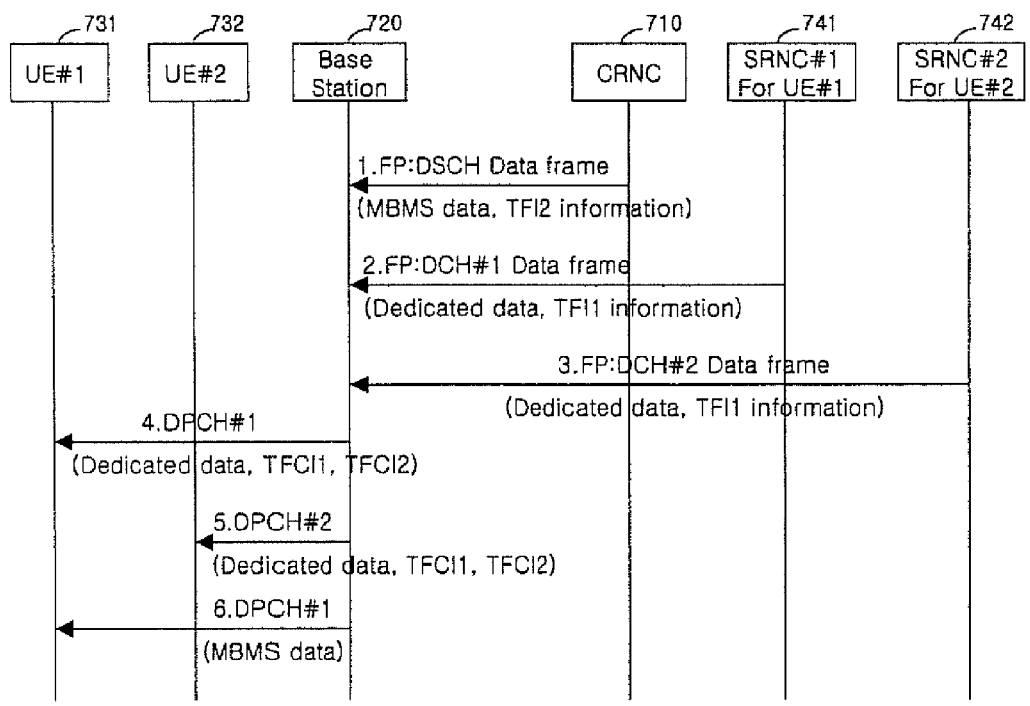
FIG. 8 illustrates a MBMS data transmission process via a point-to-multipoint DSCH according to an embodiment of the present invention.

FIG. 8 illustrates a process of transmitting MBMS data via a point-to-multipoint DSCH according to an embodiment of the present invention. Merely for the purpose of explaining this process, it is assumed that there are two terminals (Terminal #1 and Terminal #2) 731,732 that receive a particular MBMS at a cell, and that the UTRAN includes two SRNCs (SRNC #1 and SRNC #2) 741,742 that manage the dedicated resources (that are distinct from the MBMS) of the two terminals.

Namely, SRNC #1 is for Terminal #1, and SRNC #2 is for Terminal #2. The SRNC #1 and SRNC #2 transmit data to the base station and to each terminal through a CRNC that is shared by the two terminals. The CRNC handles the transmission of MBMS data via a point-to-multipoint DSCH. It should be noted that the number of terminals and SRNCs might vary according to the desired communication environment, as would be understood by those skilled in the art. The process of transmitting MBMS data via a point-to-multipoint DSCH is as follows:

1) Upon generation of MBMS data to be transmitted via the point-to-multipoint DSCH, the CRNC transmits to the base station, a MAC PDU containing MBMS data and a DSCH data frame having TFI2 (transmission format indicator 2) data that is necessary for creating TFCI2 (transmission format combination indicator) data. Here, TFI2 data includes PDSCH code data and DSCH transmission format data.

2) Distinct from the MBMS data transmission via the DSCH, the SRNC #1 transmits dedicated data of the corresponding terminal and DCH transmission format data (TFI1 data) to the base station.

3) Distinct from the MBMS data transmission via the DSCH, the SRNC #2 transmits dedicated data of the corresponding terminal and DCH transmission format data (TFI1 data) to the base station. Here, the two different SRNCs (SRNC #1 and SRNC #2) can transmit respectively different dedicated data and TFI1 data.

4) The base station creates a TFCI from the TFI2 data transferred by the CRNC and from the TFI1 data transferred from the SRNC #1, which is then transferred to Terminal #1 via DPCH #1 together with dedicated data. Here, the TFCI information of the DPCH comprises TFCI1 (that corresponds to the TFI1 data) and TFCI2 (that corresponds to the TFI2 data).

5) In the same manner, the base station creates a TFCI from the TFI2 data transferred by the CRNC and from the TFI1 data transferred from the SRNC #2, which is then transferred to Terminal #2 via DPCH #2 together with dedicated data. Here, the TFCI information of the DPCH comprises TFCI1 (that corresponds to the TFI1 data) and TFCI2 (that corresponds to the TFI2 data).

6) Terminal #1 and Terminal #2 receive the PDSCH data from the channel code data of the TFCI2 data, and from the transmission format data. The PDSCH channel allows transmission of the MBMS data.

Here, the base station must be able to recognize which terminal or which DPCH is associated to the point-to-multipoint DSCH. This is because the base station must transmit DSCH control information via the associated DPCH. In the related art, only a single associated DPCH existed in one cell. However, to support the multicasting of data, the number of associated DPCHs must equal the number of terminals that receive the MBMS service. Accordingly, upon generation of MBMS data to be transmitted via the point-to-multipoint DSCH (in step 1) above) or prior to data transmission, the relationship between the point-to-multipoint DSCH and the one or more associated DPCHs must be provided to the base station.

To summarize, in order to overcome the problems in transmitting multicast data via the DSCH according to the related art, the present invention proposes a radio (wireless) communication scheme where a RLC layer is provided in the CRNC. By using this scheme, the same service data can be transmitted to a plurality of terminals via the DSCH (referred to as a point-to-multipoint DSCH according to the present invention), yet the RLC layers required for the providing corresponding services need not be repetitively provided in many SRNCs, but be simply provided in only the CRNC. As such, UTRAN resources can be efficiently employed in providing multimedia data services (such as MBMS) to a plurality of users (terminals).

II. Providing MBMS by Establishing Two New Physical Downlink Channels

The present invention provides in an embodiment thereof, a method for providing a multimedia service in a radio communication system, the method comprising, establishing a shared data channel and a shared control channel; and transmitting data of the multimedia service via the established shared data channel and the established shared control channel.

Here, the established channels are physical layer channels, whereby the shared data channel is for data only, while the shared control channel is for control and/or data.

According to the present invention, in a wireless system that broadcasts or multicasts a plurality of data services via a D-PDSCH (Physical Downlink Shared CHannel for Data) that can be received by a plurality of terminals, the wireless system transmits data by varying the control information of the D-PDSCH at each prescribed time period, and the varied control information is transmitted via a C-PDSCH (Physical Downlink Shared CHannel for Control) that uses a different code than the D-PDSCH.

Here, the varied control information includes the channel code information, channel coding information, or modulation information of the D-PDSCH, or the information that indicates to the terminal group whether the D-PDSCH should be received for a prescribed time period. The channel code information of the D-PDSCH refers to a channel code number, a SF of the channel code, and the number of channel codes used in multi-code transmission.

The D-PDSCH according to the present invention allows transmission of data for a particular MBMS during a particular radio frame. Also, respectively different radio frames are allowed to carry respectively different MBMS data. Namely, a particular radio frame of the D-PDSCH refers to the time period of reception for a particular terminal group that desires to receive the MBMS to be transmitted at that radio frame. The D-PDSCH is mapped to a downlink common shared channel, such as an FACH or DSCH.

The C-PDSCH of the present invention performs the function of allowing transmission of control information necessary when each of the plurality of terminals receives data being transmitted through the D-PDSCH. Namely, to allow a particular terminal group to receive the data of a particular MBMS being transmitted during a particular radio frame of the D-PDSCH, control information must be transmitted (from the network) during a particular radio frame of the C-PDSCH.

The C-PDSCH of the present invention allows transmission of the control information necessary for receiving the data of respectively different MBMS during respectively different radio frames. Thus, the C-PDSCH carries the control information needed for receiving the data for one or more MBMS by one or more users.

The UTRAN manages a particular D-PDSCH and a particular C-PDSCH that is a counterpart (associated) thereto. The terminal group receiving data of a particular MBMS, receives data on both a particular D-PDSCH and its counterpart, a particular C-PDSCH.

Figure 9:
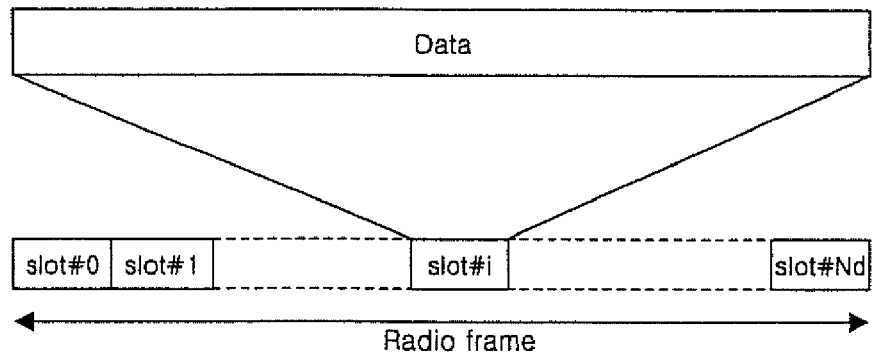
FIG. 9 illustrates a time slot structure of a D-PDSCH according to an embodiment of the present invention.
Figure 10A:
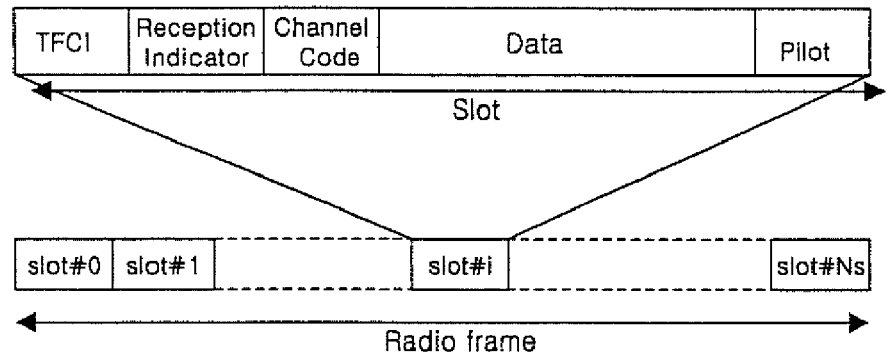
FIGS. 10A through 10E illustrate a time slot structure of the C-PDSCH according to an embodiment of the present invention.
Figure 10B:
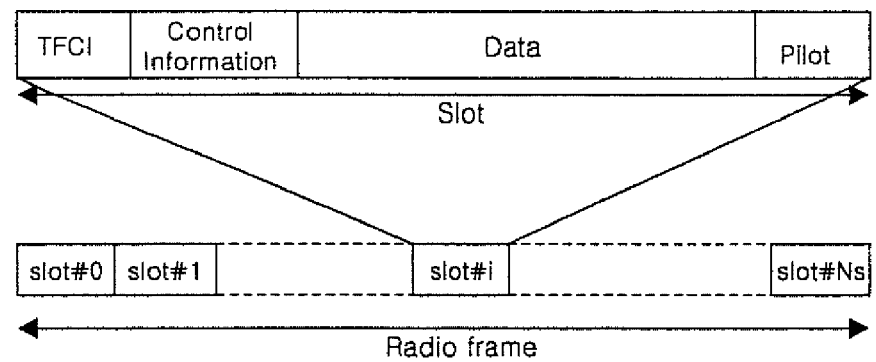
Figure 10C:
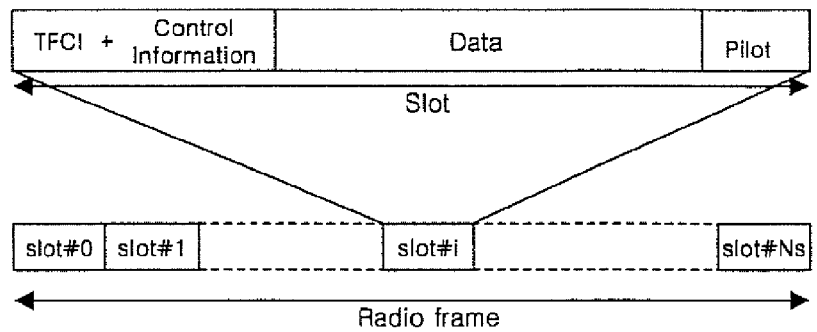
Figure 10D:
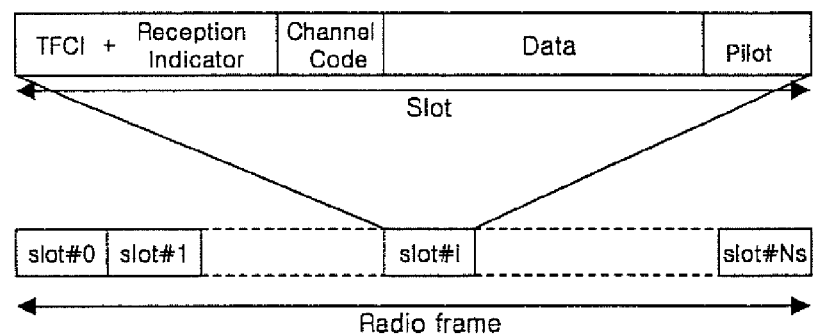
Figure 10E:
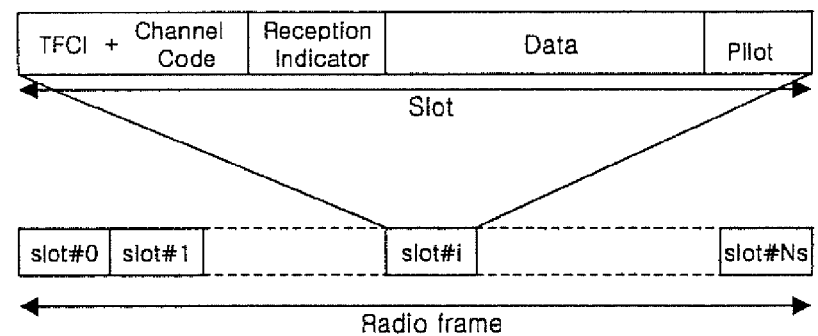

The structure of the two new physical channels (D-PDSCH and C-PDSCH) will now be described in more detail. FIG. 9 shows the structure of a D-PDSCH according to the present invention. The D-PDSCH is a physical channel that is newly established to allow downlink transmission of data for one or more MBMS, and permit one or more terminals to simultaneously receive data thereof. The D-PDSCH is used to carry respectively different MBMS data by using the division of prescribed time periods.

Here, the prescribed time period is referred to as a radio frame, and one radio frame comprises one or more slots, as shown in FIG. 9. The slot length is always constant, and one radio frame is comprised of an Nd number of slots. Each slot comprises one field for transmitting data.

Although the D-PDSCH allows transmission by using one channel code, two or more channel codes may be simultaneously used for transmission. A transmission method of simultaneously employing two or more channel codes is referred to as a multi-code transmission method. Multi-code transmission is a transmission method especially applicable for transmitting high-speed data by using a plurality of codes.

FIGS. 10A through 10E illustrate a structure of the C-PDSCH according to an embodiment of the present invention. The C-PDSCH is a newly created downlink channel allowing more than one terminal to simultaneously receive the control information of the D-PDSCH. The C-PDSCH is allowed to transmit variable control information by dividing the transmissions into prescribed time periods. Namely, the C-PDSCH allows data transmissions by updating the control information upon dividing the transmissions into certain time periods. Thus, the control information can be changed (varied) for each radio frame and then transmitted.

One radio frame comprises one or more slots. The slot length is always constant, and one radio frame comprises an Ns number of slots. In the C-PDSCH, one slot is comprised of one or more fields. One slot allows transmission of one or more data, the data are included in the one or more fields and then transmitted. The data and the fields that are transmitted by each slot of the C-PDSCH will now be described in more detail.

First, each slot may include a field that contains reception indicator data, which indicates whether a terminal should receive a particular radio frame of the D-PDSCH.

Second, each slot may include a field that contains channel code data (e.g., channel code number, SF data of the channel code, the number of channel codes used in multi-code transmissions), which is used during a particular radio frame of the D-PDSCH.

Third, each slot may include a field that contains pilot bits for estimating a condition of the radio channel at the receiving end.

Fourth, each slot may include a data field for service data transmitted by the D-PDSCH and for transmitting other services. The C-PDSCH allows transmission of service data that the related art transport channels (FACH and RACH) can transmit. Also, using the data field of the C-PDSCH, establishment data of the D-PDSCH can be transmitted. Namely, after the terminal receives the establishment data of the D-PDSCH that is transmitted by the data field of the C-PDSCH, the establishment data is used by the terminal to establish that the D-PDSCH can be received.

Fifth, each slot may include a TFCI (Transport-Format Combination Indicator) field. This field can include data regarding the number and size of the data transmission block that is transmitted to the data field of the C-PDSCH.

Each slot of the C-PDSCH may include all or any combination of the above-identified fields. Also, among the types of data of the above-identified fields, a portion thereof may be transmitted in one field. If there are two or more fields being transmitted in the slot, the order of transmission is preferably determined in advance prior to the design of the radio (wireless) network.

In particular, FIGS. 10A through 10E illustrate different forms of the radio frames for the C-PDSCH created by various exemplary embodiments according to the present invention. Form A shows one slot that includes all five types of fields.

In contrast, as shown in Form B, the reception indicator field and a channel code field may be transmitted together via a single control information field. Namely, each slot may include one field for transmitting the control information of the D-PDSCH.

Also, as shown in Form C, control information may be transmitted together with the TFCI information within the same field. In other words, control information such as, reception indicator data and channel code data may be transmitted together with the TFCI information in a single field. Thus, the structure of Form C is the same as that of the related art SCCPCH.

As shown in Form D and Form E, the reception indicator data or the channel code data can be transmitted together with the TFCI information in a single field. Here, channel code data or reception indicator data that are not transmitted together with the TFCI information may be transmitted in an independent field.

Figure 11:
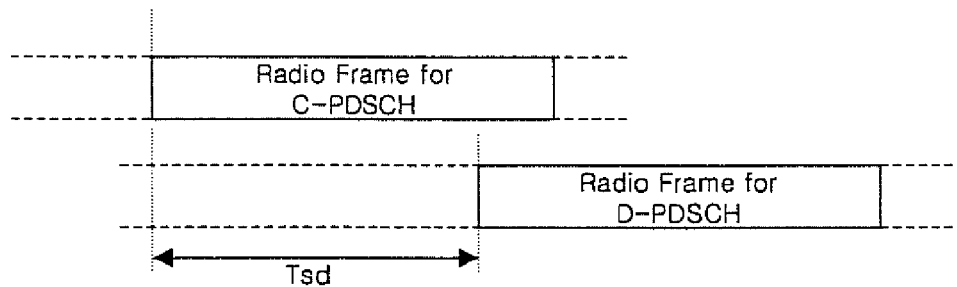
FIG. 11 illustrates the time relationship between the C-PDSCH and the D-PDSCH according to an embodiment of the present invention.

FIG. 11 illustrates the time relationship between the C-PDSCH and the D-PDSCH. A particular radio frame of the C-PDSCH carries control information for a particular radio frame of the D-PDSCH. Namely, the particular radio frame of the C-PDSCH is an associate or a counterpart (complement) to the particular radio frame of the D-PDSCH.

The transmission side (e.g., UTRAN) transmits these radio frames having a complementary (associated) relationship with a prescribed time interval (delay). In other words, the transmission side provides that the transmission starting point of the particular radio frame for the C-PDSCH and the transmission starting point of the particular radio frame for the D-PDSCH have a time delay amounting to the time interval Tsd. Accordingly, the radio frame of the C-PDSCH is always transmitted by the transmission side before the associated radio frame of the D-PDSCH, by the time interval Tsd.

The reception side (e.g., terminal) also receives the radio frame of the C-PDSCH first, and then after a time interval Tsd, the associated radio frame of the D-PDSCH is received. The Tsd value is determined by the RNC when the C-PDSCH and the D-PDSCH are established. The RNC transfers the determined Tsd value to the base station (Node-B) and the terminals (UE) when the channels are established. For the terminal, the RRC layer of the RNC (RNC RRC layer) first transfers the Tsd value to the RRC layer of the terminal (terminal RRC layer). Then, the terminal RRC layer transfers the received Tsd value to physical layer of the terminal. The terminal can determine the associated relationship between the radio frame of the C-PDSCH and the radio frame of the D-PDSCH. Namely, the terminal decides that the radio frame of the C-PDSCH and the radio frame of the D-PDSCH, having a time interval of Tsd therebetween, have an associated relationship.

Figure 1:
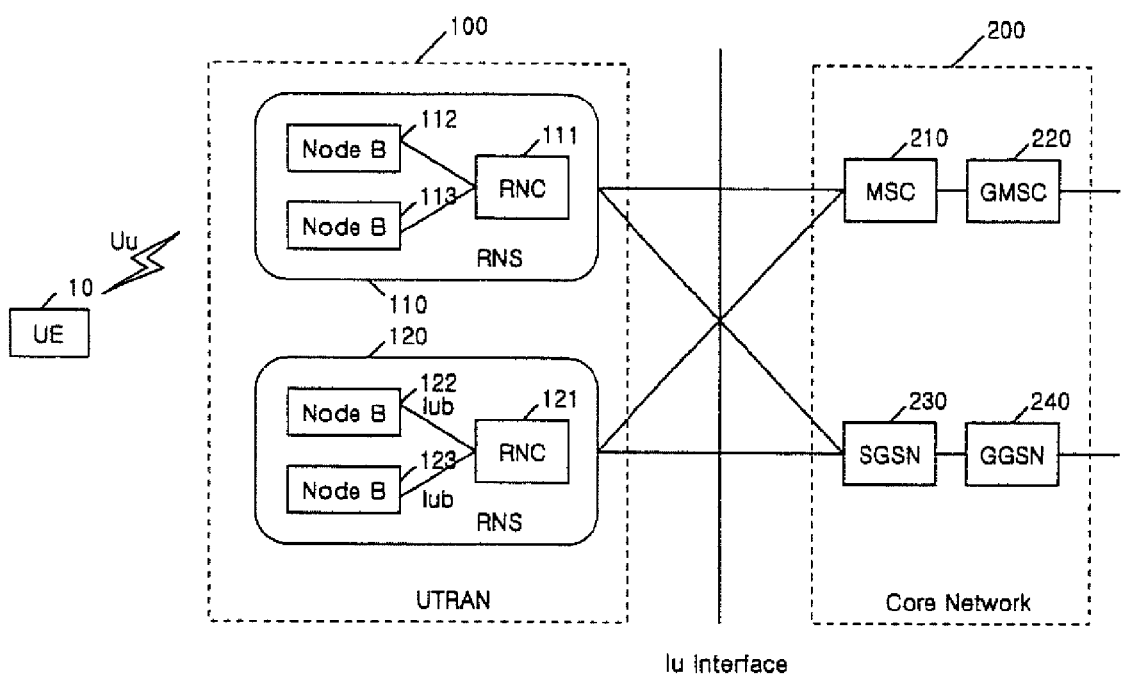
FIG. 1 illustrates the components of a typical UMTS network applicable in the related art and in the present invention.
Figure 2:
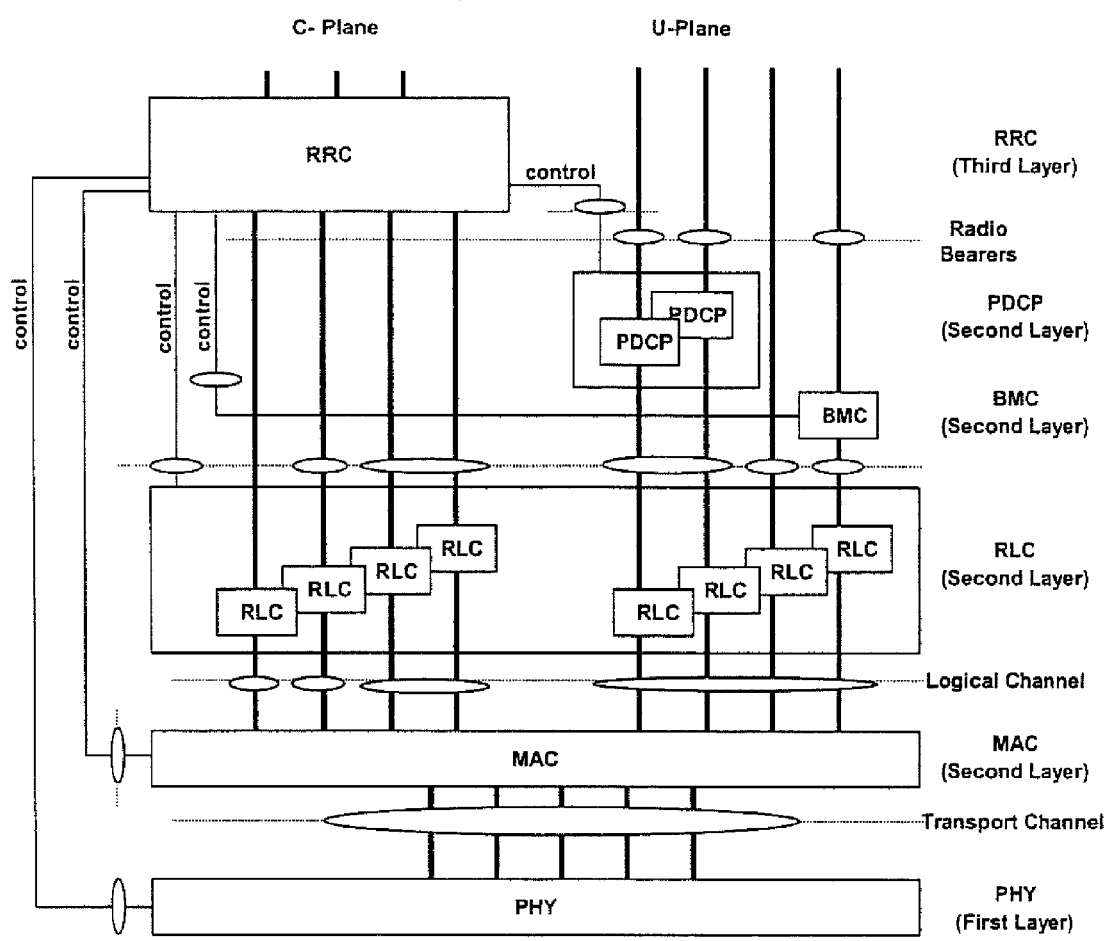
FIG. 2 illustrates a radio access interface protocol structure between the terminal and UTRAN that are based upon the 3GPP wireless access network standards.
Figure 3:
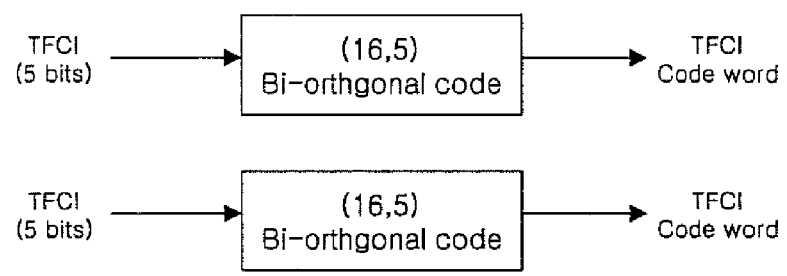
FIG. 3 illustrates a channel coding method for a TFCI that is transmitted via the associated DPCH.
Figure 4:
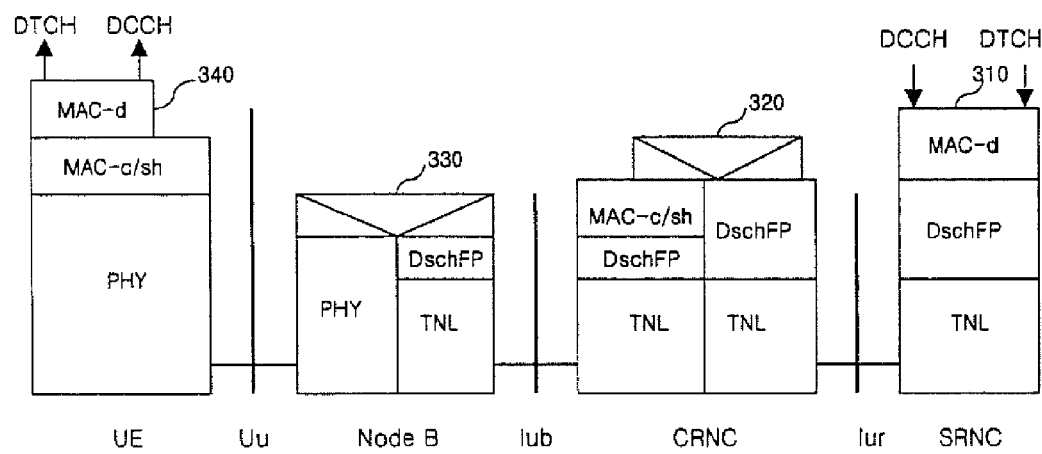
FIG. 4 illustrates a signal flow diagram of a data transmission process for a DSCH via an Iur interface according to the related art.
Figure 5:
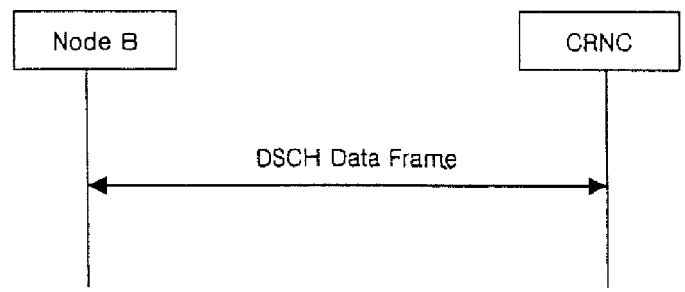
FIG. 5 illustrates a data transmission process for the DSCH via an Iub interface according to the related art.

If the TFCI field allows transmission of two or more data, as in Forms C, D and E in FIG. 5, the channel coding method of the TFCI division (partition) mode (mentioned in the related art) may be employed. Namely, respectively different bi-orthogonal code encoders are used for the two data included in the TFCI field. In other words, in Form C, the TFCI information and the control information are channel encoded by using respectively different bi-orthogonal encoders. Also, in Form D, the TFCI information and the reception indicator data are channel encoded by using respectively different bi-orthogonal encoders. In Form E, the TFCI information and the channel code data are channel encoded by using respectively different bi-orthogonal encoders.

Figure 12:
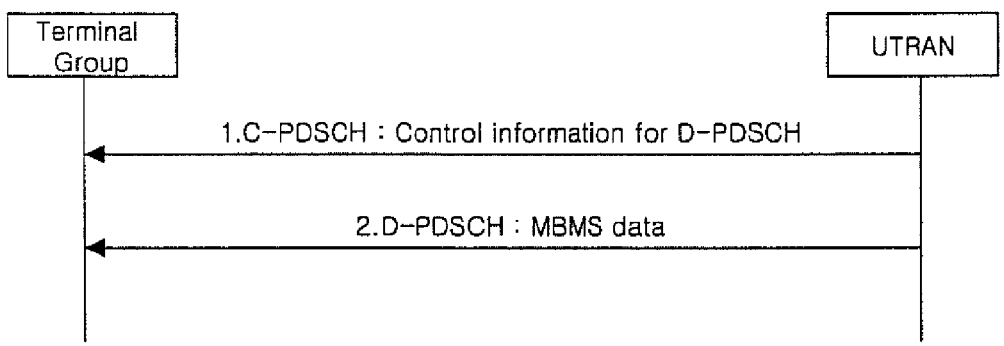
FIG. 12 illustrates a transmission and reception process of the C-PDSCH and the D-PDSCH according to an embodiment of the present invention.

FIG. 12 illustrates an example of the transmission and reception process of the C-PDSCH and the D-PDSCH according to the present invention. Here, the situations where the C-PDSCH is used to carry channel code data and reception indicator data of the D-PDSCH using two fields or one field will be described. Namely, the control information includes the channel code data and the reception indicator data of the D-PDSCH. Here, the terminal group refers to more than one terminal that receives particular MBMS data via the D-PDSCH. In the UTRAN, transmitting to the terminal group refers to broadcasting or multicasting.

1) The UTRAN transmits control information of the D-PDSCH via the radio frames of the C-PDSCH. The UTRAN, for each radio frame, transmits control information of the D-PDSCH. If the reception indicator of the control information indicates that the terminal should receive the associated radio frame of the D-PDSCH, the physical layer of the terminal performs the following step. If the reception indicator of the control information does not indicate that the associated radio frame of the D-PDSCH should be received, the physical layer of the terminal does not perform the following step, but receives the control information of the next radio frame.

2) If the reception indicator of the control information indicates that the associated radio frame of the D-PDSCH should be received, the physical layer of the terminal, using the received channel code data of the control information, receives the data of the radio frame of the D-PDSCH which is associated to the radio frame of the C-PDSCH.

Figure 13:
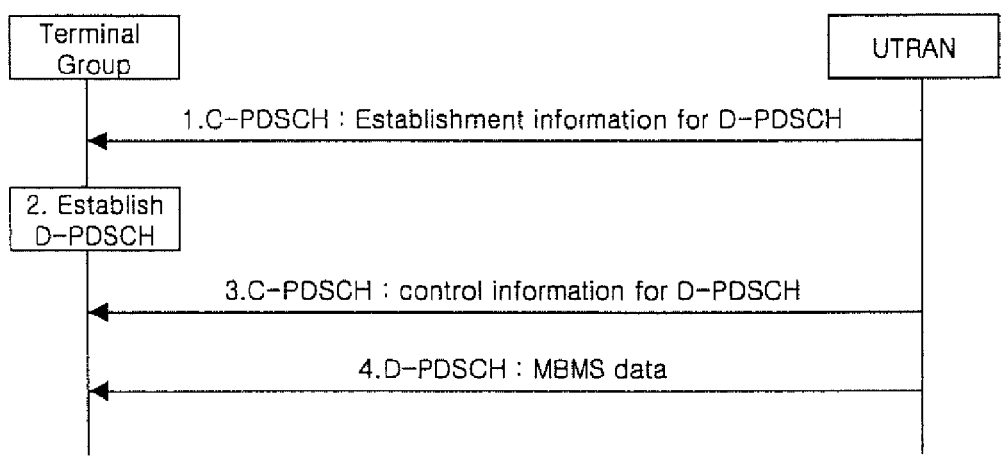
FIG. 13 illustrates a transmission and reception process of the C-PDSCH and the D-PDSCH according to another embodiment of the present invention.

FIG. 13 illustrates a process of transmission and reception of the C-PDSCH and the D-PDSCH according to an embodiment of the present invention. Here, a radio frame of the C-PDSCH includes a data field, and a description of when the data field transmits establishment data of a D-PDSCH will be made. The terminal group refers to more than one terminal that receives a particular MBMS data via the D-PDSCH. In the UTRAN, transmitting to the terminal group refers to broadcasting or multicasting.

1) The RRC layer of the UTRAN transmits D-PDSCH establishment data to the RRC layer of the terminal via lower layer services. Here, the data field of the C-PDSCH transmits the establishment data of the D-PDSCH.

2) The terminal RRC layer forwards the received D-PDSCH establishment data to the lower layers of the terminal, and establishes itself to receive the D-PDSCH.

3) The UTRAN transmits the control information of the D-PDSCH via the radio frame of the C-PDSCH. The UTRAN transmits the control information of the D-PDSCH at each and every frame. If the reception indicator of the control information indicates that the terminal should receive the associated radio frame of the D-PDSCH, the physical layer of the terminal performs the following step. If the reception indicator of the control information does not indicate that the associated radio frame of the D-PDSCH should be received, the physical layer of the terminal does not perform the following step, but receives the control information of the next radio frame.

4) If the reception indicator of the control information indicates that the associated radio frame of the D-PDSCH should be received, the physical layer of the terminal, using the received channel code data of the control information, receives the data of the radio frame of the D-PDSCH which is associated to the radio frame of the C-PDSCH.

As described above, in providing various MBMS data to terminals (UE) within a cell via a FACH or a DSCH using the related art methods, the transmission power required for providing even one data service (MBMS) occupies a large portion of the overall base station (Node-B in UMTS) power, because the FACH uses discontinuous transmissions, while the DSCH carries control information via an exclusive physical channel.

Accordingly, the present invention employs a variable spreading method using a variable SF, instead of a discontinuous transmission method, to restrict the D-PDSCH. Also, a C-PDSCH, which is not a downlink exclusive physical channel, is used as the channel for carrying control information of the D-PDSCH. By doing so, the data transmission efficiency for data services, such as MBMS is improved.

It can be understood that the present invention has been described in the context of providing MBMS to users for exemplary purposes only. Thus, the teachings and/or suggestions of the present invention may also be applicable to other types of signal transmissions or data transfers that should be provided to a plurality of users.

It will be apparent to those skilled in the art that various modifications and variations can be made in the present invention. Accordingly, it is intended that the present invention covers the modifications and variations of this invention provided they come within the scope of the appended claims and their equivalents.

What is claimed is:

1. A method of providing a broadcast or multicast service, the method comprising:

transmitting control information via a second downlink common physical channel such that at least one terminal is able to receive data of the broadcast or multicast service which is transmitted via a first downlink common physical channel; and transmitting the data of the broadcast or multicast service via the first downlink common physical channel, wherein the second downlink common physical channel comprises at least one of a TFCI (Transport Format Combination Indicator) field and a Pilot field to transmit the control information, wherein the second downlink common physical channel carries data of a service transmitted from an upper layer via a transport channel and which is different from the transmitted data of the broadcast or multicast service, and wherein the first downlink common physical channel and the second downlink common physical channel are mapped to the transport channel, the transport channel being a forward access channel (FACH).

2. The method of claim 1, wherein the first downlink common physical channel is a downlink common data physical channel.

3. The method of claim 1, wherein the second downlink common physical channel is a downlink common control physical channel.

4. The method of claim 1, wherein the transmitted data of the broadcast or multicast service via the first downlink common physical channel is used by a plurality of codes.

5. The method of claim 1, wherein the control information transmitted via the second downlink common physical channel comprises at least one of a receiving indicator field and a channel code field.

6. The method of claim 1, wherein the control information transmitted via the second downlink common physical channel further comprises a receiving indicator field and a channel code field.

7. A method of receiving a broadcast or multicast service, the method comprising:

receiving in a terminal control information via a second downlink common physical channel to receive data of the broadcast or multicast service which is received via a first downlink common physical channel from a network; and receiving in the terminal the data of the broadcast or multicast service via the first downlink common physical channel, wherein the second downlink common physical channel comprises at least one of a TFCI (Transport Format Combination Indicator) field and a Pilot field to transmit the control information, wherein the second downlink common physical channel carries data of a service to be received by an upper layer via a transport channel, and which is different from the received data of the broadcast or multicast service, and wherein the first downlink common physical channel and the second downlink common physical channel are mapped to the transport channel, the transport channel being a forward access channel (FACH).

8. The method of claim 7, wherein the first downlink common physical channel is a downlink common data physical channel.

9. The method of claim 7, wherein the second downlink common physical channel is a downlink common control physical channel.

10. The method of claim 7, wherein the received data of the broadcast or multicast service via the first downlink common physical channel is used by a plurality of codes.

11. The method of claim 7, wherein the control information received via the second downlink common physical channel comprises at least one of a receiving indicator field and a channel code field.

12. The method of claim 7, wherein the control information received via the second downlink common physical channel further comprises a receiving indicator field and a channel code field.

* * * * *